(12) United States Patent
Tchoukaleysky

(10) Patent No.: US 9,030,525 B2
(45) Date of Patent: May 12, 2015

(54) METHOD AND APPARATUS FOR OPTIMAL MOTION REPRODUCTION IN STEREOSCOPIC DIGITAL CINEMA

(75) Inventor: Emil Tchoukaleysky, Toronto (CA)

(73) Assignee: Thomson Licensing, Issy les Moulineaux (FR)

( * ) Notice: Subject to any disclaimer, the term of this patent is extended or adjusted under 35 U.S.C. 154(b) by 430 days.

(21) Appl. No.: 13/517,061

(22) PCT Filed: Dec. 22, 2009

(86) PCT No.: PCT/IB2009/007858
§ 371 (c)(1),
(2), (4) Date: Jun. 19, 2012

(87) PCT Pub. No.: WO2011/077177
PCT Pub. Date: Jun. 30, 2011

(65) Prior Publication Data
US 2012/0300025 A1    Nov. 29, 2012

(51) Int. Cl.
| | |
|---|---|
| H04N 7/00 | (2011.01) |
| H04N 13/00 | (2006.01) |
| H04N 15/00 | (2006.01) |
| H04N 13/02 | (2006.01) |
| G06T 5/00 | (2006.01) |

(52) U.S. Cl.
CPC .......... *G06T 5/003* (2013.01); *H04N 13/0003* (2013.01); *G06T 2207/10021* (2013.01); *G06T 2207/20012* (2013.01); *G06T 2207/20201* (2013.01)

(58) Field of Classification Search
USPC .................................................. 348/41–161
See application file for complete search history.

(56) References Cited

U.S. PATENT DOCUMENTS

| | | | | |
|---|---|---|---|---|
| 5,619,293 | A * | 4/1997 | Usui | 396/55 |
| 6,411,326 | B1 * | 6/2002 | Tabata | 348/47 |
| 7,119,816 | B2 * | 10/2006 | Zhang et al. | 345/634 |
| 7,301,548 | B2 * | 11/2007 | Zhang et al. | 345/634 |
| 7,495,664 | B2 * | 2/2009 | Keller et al. | 345/426 |

(Continued)

FOREIGN PATENT DOCUMENTS

| | | |
|---|---|---|
| CN | 101021948 | 8/2007 |
| JP | 2004207780 | 7/2004 |
| JP | 2005229280 | 8/2005 |

OTHER PUBLICATIONS

Patel et al., "Combining Motion Blur and Stereo," Proceedings of the SPIE, vol. 1669, Jan. 1, 1992, pp. 71-82.

*Primary Examiner* — Joseph Ustaris
*Assistant Examiner* — Talha Nawaz
(74) *Attorney, Agent, or Firm* — Robert D. Shedd; Jeffrey M. Navon; Catherine A. Cooper

(57) ABSTRACT

A method and apparatus are described including determining an inter-frame object displacement for each object in a left eye image frame pair, determining an inter-frame object displacement for each object in a right eye image frame pair, determining a convergence shifting field between each object in the left eye image and the right eye image pair, determining an amount of motion blur responsive to the inter-frame object displacement for each object in the left eye image frame pair, the inter-frame object displacement for each object in the right eye image frame pair, and the convergence shifting field between each object in the left eye image and the right eye image pair and adjusting the motion blur by the amount of motion blur.

16 Claims, 6 Drawing Sheets

(56) References Cited

U.S. PATENT DOCUMENTS

| | | | |
|---|---|---|---|
| 7,708,407 B2 * | 5/2010 | Yang et al. | 351/209 |
| 7,840,046 B2 * | 11/2010 | Jerebko et al. | 382/128 |
| 8,160,149 B2 * | 4/2012 | Demos | 375/240.16 |
| 8,164,638 B2 * | 4/2012 | Kondo et al. | 348/208.4 |
| 8,279,264 B2 * | 10/2012 | Moon et al. | 348/36 |
| 8,300,086 B2 * | 10/2012 | Pockett et al. | 348/42 |
| 8,567,953 B2 * | 10/2013 | O'Dor et al. | 353/7 |
| 8,593,542 B2 * | 11/2013 | Steinberg et al. | 348/239 |
| 8,682,097 B2 * | 3/2014 | Steinberg et al. | 382/275 |
| 8,755,837 B2 * | 6/2014 | Rhoads et al. | 455/556.1 |
| 2002/0041703 A1 * | 4/2002 | Fox | 382/154 |
| 2004/0061795 A1 * | 4/2004 | Kondo et al. | 348/239 |
| 2004/0081335 A1 * | 4/2004 | Kondo et al. | 382/107 |
| 2004/0090523 A1 * | 5/2004 | Kondo et al. | 348/46 |
| 2005/0104901 A1 * | 5/2005 | Zhang et al. | 345/629 |
| 2008/0316327 A1 * | 12/2008 | Steinberg et al. | 348/222.1 |
| 2009/0096897 A1 * | 4/2009 | Saito | 348/241 |
| 2011/0109723 A1 * | 5/2011 | Ashbey | 348/44 |
| 2011/0188836 A1 * | 8/2011 | Popkiewicz et al. | 386/278 |
| 2011/0249750 A1 * | 10/2011 | Fuchikami et al. | 375/240.16 |
| 2012/0069222 A1 * | 3/2012 | Steinberg et al. | 348/239 |
| 2012/0176481 A1 * | 7/2012 | Lukk et al. | 348/47 |
| 2012/0242790 A1 * | 9/2012 | Sandrew et al. | 348/43 |
| 2013/0329955 A1 * | 12/2013 | Steinberg et al. | 382/103 |

* cited by examiner

METHOD AND APPARATUS FOR OPTIMAL MOTION REPRODUCTION IN STEREOSCOPIC DIGITAL CINEMA

This application claims the benefit, under 35 U.S.C. §365 of International Application PCT/IB09/007858, filed 22 Dec. 2009, which was published in accordance with PCT Article 21(2) on 30 Jun. 2011 in English.

FIELD OF THE INVENTION

The present invention relates to cinema and in particular, to optimal motion reproduction in stereoscopic digital cinema by adaptively adjusting motion blur for scene objects.

BACKGROUND OF THE INVENTION

Achievements in Stereoscopic Digital Cinema have brought some new challenges in the reproduction of scene objects that appear to be closer to the theatre audience, i.e. to be front image-plane objects. If these elements happen to move dynamically, they may be displayed, or projected on the screen, with some motion jumpiness (also called judder). Alternatively, if the same objects, presenting themselves closer to the viewer, move with speed below a certain nominal value, their naturally captured motion blur will be visualized with more pronounced effect. Classical film cinema and 2D Digital Cinema are not affected by the above correlation between the motion blur amount and the image depth. However, this correlation has a variable behavior in 3D imaging. With this phenomenon there emerges a new problem, pertaining to the Stereoscopic Three-Dimensional (S3D) depth portrayal. It has a slightly irritating effect on the audience, caused by the discrepancy of the correlation between motion blur and image depth, which adds to the discomfort of wearing special glasses during 3D presentations.

There is little published work regarding the irregular motion particularities of dynamic scene objects which appear in the front viewing plane of a stereoscopic cinema projection. And yet, the present method uses some image processing techniques that are known in the existing practice at the cinema theatres. It employs differently the motion blur fundamentals for the purpose of stereoscopic imagery.

There are two categories of methods aimed at improving motion reproduction, to which the present invention could be compared:

The first category includes methods for adding motion blur to reduce the frames per second rate in stereoscopic 3D digital cinema. These methods aim to reduce the frame repetition rate from 72 FPS to 48 FPS, per eye, by enhancing the directional inter-frame scene object trails. The motion blur field is extracted for each eye-image during the post-production phase of the movie mastering. The added picture components are tiny, but they contribute to the elimination of the motion breaking effect, associated with high-speed objects in the sequence of left eye (LE)-right eye (RE) frames, when the frame repetition is at the standard value of 48 FPS. The advantage of this category of methods is the rendering of the stereoscopic imagery to add adaptive motion blur and thus reduce the judder artifacts. The disadvantage of these methods is that their motion analysis is based only on the classic inter-frame difference, which does not encompass the particularities of the 3D pictures.

The second category includes methods for limiting the proximity (closeness) of 3D scene objects to the viewers. This approach restricts the value of the convergence offset range, e.g. it limits the extent to which the viewers in the theatre will have to cross their eyes so they can perceive the stereoscopic pictures as a 3D phenomenon. The initial convergence is determined during the camera acquisition and can be modified to some extent during post-production. By limiting the proximity (or rather the appearance of closeness) to the viewers, the motion artifact is also reduced, since the closer the objects are in the virtual space between the projection screen and the audience, the more artifacts are visible. The advantage of this category of methods is in their relative simplicity in achieving improved motion reproduction: That is achieved by convergence correction, which is a parallel image shift process. Their disadvantage is that these methods affect the creative decision of the movie authors and directors by manipulating the convergence and thus the stereoscopic intention of the presentation.

Another consequence of the function of the motion blur amount is electronic convergence. As one of the eye-images shifts horizontally relative to the other eye-image, the scene objects could appear closer to the viewer. Since the human brain concentrates better on the closer zone, the acuity of the Human Visual System (HVS) highlights any motion disproportion. To counteract this problem, what is needed is a method and apparatus to recognize and optimize the relation between motion blur and the changed (modified, corrected) electronic convergence. The term electronic convergence here defines the shifting between LE and RE image in video domain, done at post-production.

SUMMARY OF THE INVENTION

The method and apparatus of the present invention contribute to more realistic perception by the cinema theatre audience of some elements in a three-dimensional movie presentation—particularly of scene objects that appear to be close to the viewer's eye; objects which move faster than a nominal speed or slower than a nominal speed. The method is based on estimating the optimal motion blur for given dynamic scene objects, and comparing the estimated motion blur to measured values of motion blur for the left eye image and for the right eye image. Weighting the difference, the image processing of the present invention then reduces the blur for both eye images or will add a small amount of blur to them, for the purpose of smooth object displacement at 24 frames per second. The speed of 24 FPS is the same for capturing and projection. The present invention is directed towards the new possibilities for stereo picture rendering in post production, where the 3D convergence and the parallax rendering are employed. The fundamental motivation comes from the Human Visual System's need to perceive certain motion blur, and the random ability of the image frame sequence to satisfy it. Stereoscopic imaging in digital cinema just highlights this discrepancy. The discrete presentation of a naturally evolving scene in the image frame sequence is known to carry motion artifacts like judder (a shaking or wobbling effect in a video image) or strobing effect, which the present invention reduces.

The 3D Digital Cinema introduces new possibilities for the movie creators. Among these possibilities are convergence processing and manipulation. By shifting horizontally to the left or to the right one of the eye-images in a frame buffer or via a computer graphics application, the picture objects appear closer to or farther from the viewer. Humans cross their eyes to track the object that approaches them along the z-axis, an action which causes the problem of variable perception of the moving element. To overcome it, the perception shift is analyzed by the proposed approach of the present invention and the motion blur is compensated accordingly by the method and apparatus of the present invention.

The task is to find a means for analyzing the relation between the motion blur and the image planes in a stereoscopic reproduction and to introduce a method and apparatus for better adapting 3D dynamic objects to cinematic presentations at the speed of 24 frames per second (FPS). The adaption of 3D dynamic objects must not alter the creative image content. Desirable motion blur could be added or subtracted to the presentation file by its creators during the mastering process at the post-production facility, as well as at the computer graphics phase.

The method of the present invention reduces the motion blur for front plane 3D objects that move slower than the threshold (nominal) speed in the 24 frames per second sequence and adds motion blur for the fast objects that move above this threshold speed. The threshold speed is when an object crosses one tenth of the video frame for one twentieth of a second. It also optimizes the object trails duration during convergence processing. The changes in the amount of blur are the same for both eye-images (left eye and right eye), and thus changes are minimal, aiming to keep the director's creative intentions intact and to preserve the dynamic resolution for the case of eye tracking.

A method and apparatus are described including determining an inter-frame object displacement for each object in a left eye image frame pair, determining an inter-frame object displacement for each object in a right eye image frame pair, determining a convergence shifting field between each object in the left eye image and the right eye image pair, determining an amount of motion blur responsive to the inter-frame object displacement for each object in the left eye image frame pair, the inter-frame object displacement for each object in the right eye image frame pair, and the convergence shifting field between each object in the left eye image and the right eye image pair and adjusting the motion blur by the amount of motion blur.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
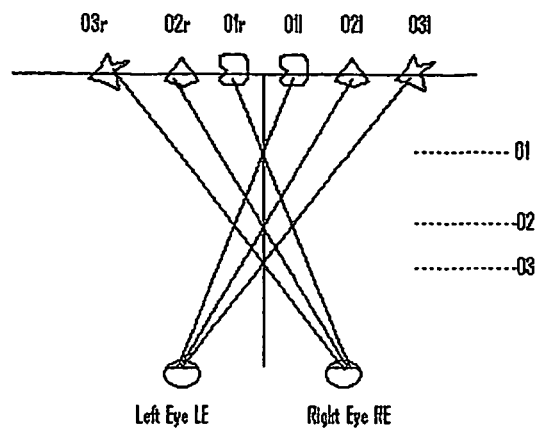
FIG. 1 shows the initial convergence between LE and RE images as a vector displacement field of the scene objects.

The progress in Stereoscopic Digital Cinema revealed new problems in the projection of scene objects that are perceived as closer to the theatre audience. If these objects move with speed comparable to the maximum reproducible speed of the frame sequence, they may be displayed on the screen with some motion disruption. Conversely, if the same objects, being closer to the viewer, move with speed below a certain nominal value, their trailing elements, or motion blur, will be visualized more explicitly.

It is known from two-dimensional image processing that, when increased or reduced appropriately, motion blur can be a valuable tool for enhancing the reproduction of dynamic scene objects. Some natural motion blur occurs during the original camera capture (both digital and analog capture). It appears as object trails while the objects move or change their shape. This physical event is caused by the limited number of frames per second for picture acquisition, e.g. 24 FPS, where the scene components continue to move during the time-period of one frame, and the exposure process (for digital or film capture) leaves motion trails in the discrete frame. This phenomenon is the cause of the intra-frame motion blur. There are image processing systems, including in post-production and at the computer graphics stations that analyze the inter-frame difference and could add to, or reduce the amount of motion blur per pixel within a given frame pair. A frame pair is, for example, frame 1 and frame 2. The next frame pair is frame 2 and frame 3.

Stereoscopic 3D digital cinema presents a case where the eye-images are projected in a sequence for the left eye and then for the right eye. This means one of the eye-images is covered, or dark, while the video frame for the other eye is projected on the screen. As a result, the audience observes some motion breaking. Second, the 3D cinema visualizes volumetric scene objects in the virtual space between the projection screen and the viewer and they appear closer to the HVS. The "closest" objects may exhibit jumpiness, and in such cases additional motion blur could be used to smooth the motion blur. Conversely, in slower moving objects the blur could be fairly visible in the closer zone, and in this case the blur amount should be reduced. An objective of the present invention is to use adaptive motion blur for bringing optimal reproduction of dynamic scenes.

Three steps are performed to solve the problem of adaptive 3D motion blur.

determining the compound inter-frame object displacement separately for the LE image and the RE image determining a convergence-shifting field between the LE image and the RE image determining a motion blur amount as function of convergence-shifting field between the LE image and the RE image, and inter-frame object displacement for the LE image and the RE image.

The speed of the scene objects in image processing is defined by their inter-frame movement, or their inter-frame displacement, measured in pixels. The same is valid in Stereoscopic Three-Dimensional (S3D) imaging for both eye images. An additional factor in S3D is the object movement in depth, or along the Z-axis, caused by the convergence changes. In arriving at the present invention, both phenomena were analyzed—the two-dimensional object speed (as an argument of the function of the optimal motion blur amount) and the convergence between the LE and RE pictures (based on the horizontal shifting between the eye-images). The video frame rate determines the options for maximum object speed visualization on the screen and on the display. For cinematic reproduction at 24 FPS (or projected frames at multiple of 24 FPS) there is a limitation for the captured scene object movement, established by the cinematographer society. In S3D there is a need for an additional step namely to find the optimal correlation between the motion blur amount and the object's speed when a dynamic object is positioned in the virtual space close to the viewers:

if the speed of a 3D object is lower than the medium speed (by more than 10%), then the motion blur amount for the close virtual space has to be reduced correspondingly. The HVS tends to concentrate on close-by objects and easily sees their motion trails if the speed of a 3D object is about plus or minus 10% of the medium speed, then the motion blur amount for the close virtual space has to be retained unchanged if the speed of a 3D object is higher than the medium speed (by more than 10%), then the motion blur amount for the close virtual space has to be increased correspondingly. This will prevent viewers from seeing motion breaking (jumpiness or judder) on the projector screen in the cinema theatre. The increased amount is minimal to consider possible eye tracking of scene objects.

The above description makes it clear that motion blur is increased or reduced depending on an object's speed at a given convergence value. Motion blur is also increased or reduced depending on the convergence value, at a given object's speed. The relation is also proportional—if the convergence is larger than a nominal convergence (threshold convergence), then increase the motion blur and vice versa. The nominal convergence (threshold convergence) measured in pixels, is approximately 50 pixels distance between LE and RE images of one frame pair. That is, both speed and convergence affect the motion blur.

The compound Inter-Frame Object Displacement is itself an image, containing an array of elements whose values are motion dependent. In the simplest case, the value of each element reflects the pixel differences between consecutive frames of the same frame pair. The frame pair is between successive left eye images and between successive right eye images. That is, for example, LE image frame 1 and LE image frame 2 are compared to determine the distance between the same object in both frames of the frame pair. Similarly, RE image frame 1 and RE image frame 2 are compared to determine the distance between the same object in both frames of the frame pair.

This displacement is denoted as:

IF Disp→for Inter-Frame Object Displacement

It should be noted that the linear speed of the object may increase as it moves away from the viewer, but its angular speed remains the same.

FIG. 1 shows the initial convergence between LE and RE images as vector displacement field of the scene objects, which is analyzed below.

Next, the initial convergence distribution field is denoted as:

InConv→for Initial Convergence

The InConv is an array of values presenting the object inter-instance values of the two captured images for LE and RE.

It has been found in the research that the range of pixel shifting of 5 to 100 pixels brings good results. The pixel shifting is in either direction. That is, for example, the object may be traveling in the left to right direction or the right to left direction so the motion blur is traveling with the object (the motion blur is generally behind the object). The pixel shifting can, therefore, be in either direction depending on the direction of travel of the object. The pixel shifting is applied to an initial depth position. The result of pixel shifting is a corrected depth position.

The parallel shift of one of the eye-images relative to the other determines a new eye convergence point for all of the objects in the reproduced 3D scene. In post-production this process is usually implemented by its stereoscopic color correction system. The eye convergence, or eye crossing, in S3D cinema happens between the projection screen and the viewer, along an axis perpendicular to the screen (Z axis). The process is known as negative convergence, which contributes to the perception of volumetric objects by the HVS, or gives the sense of depth.

When processed by a digital color corrector (convergence corrector), the distance between one and the same element of an object in LE and RE images is measured in pixels. When a volumetric scene is captured via the stereoscopic rig of two video cameras, and converted to two flat (or 2D) digital pixel planes, the spatial information is carried by the variable positional shift between the two object-instances within the LE and RE images'. The larger object shift will require increased eye crossing and this object will appear closer to the viewer, while a smaller shift between the two object instances will bring the sense of a more distant scene element.

Figure 2:
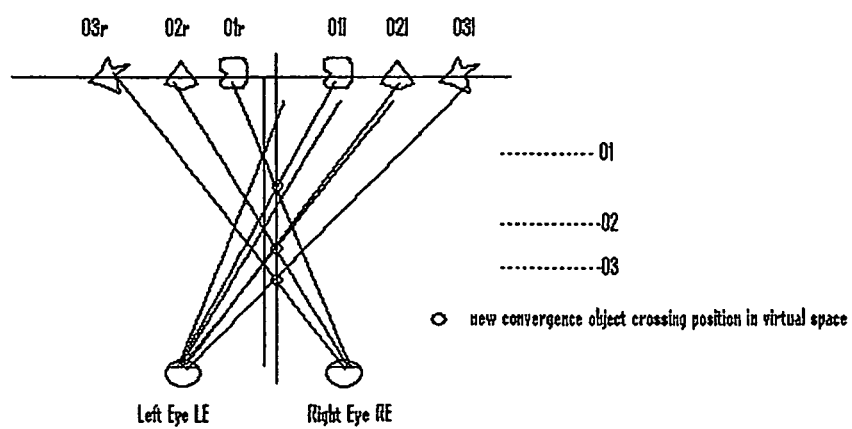
FIG. 2 shows an object that initially appeared closer to the viewer that is now even closer after the LE image was moved to the right.

The parallel shifting of one of the eye images changes the object inter-instance distance by one and the same absolute pixel amount for all objects. It has been found in the research that parallel shifting in the range of 10 to 70 pixels is acceptable in either direction. That is, for example, the object may be traveling in the left to right direction or the right to left direction so the motion blur is traveling with the object (the motion blur is generally behind the object). The parallel shifting can, therefore, be in either direction depending on the direction of travel of the object. It is the relative pixel amount that makes the difference. The parallel shifting is applied to the corrected depth position. FIG. 2 shows this phenomenon—an object that initially appeared to be closer to the viewer, is now much closer after LE image got moved to the right for the purpose of pronounced stereoscopic effect. In FIG. 2 object O1 moved right and objects O2 and O3 also moved right maintaining the same relative distance between objects O1, O2 and O3. An object that initially appeared to be a bit farther, but still in the negative convergence space, is now a bit closer to the viewer, though with less pronounced effect than the first object. The image shifting is conducted in the frame buffer, or frame store, of the color corrector.

The induced convergence shift in the color corrector at the post-production facility is denoted as:

CorrConv→for Corrected Convergence

The value of this shift, measured in pixels, is constant for all objects in the picture due to the parallel shift. Its summation with the initial convergence distribution field brings the desired effect of control in the virtual 3D space.

Having defined above the variables for the calculation of the optimal motion blur, its function is:

Motion Blur=$F$ (Initial Convergence, Corrected Convergence, Inter-Frame Object Displacement)

or

Motion Blur=$F$ ($K1$.InConv, $K2$.CorrConv, $K3$.(IF Disp)), where K1, K2, K3 are functional coefficients. The motion blur is defined for every pixel of the image frame, and is the same for LE and RE pictures. It could be less or more compared to its initial value. Usually a small amount of the motion blur makes a difference in the perception by the HVS.

Inter-Frame Displacement IF Disp is defined by the distance, measured in pixels, between the position of the scene objects in two consecutive video frames. It is to be measured separately for the objects in the LE images sequence and in the RE image sequence. In the simplest case the IF Disp is the same for the image sequences for both eyes.

The Initial Convergence InConv in the Motion Blur function above is determined:
1) by the LE-RE cameras inter-axial separation, or the distance between the lenses of the two cameras—usually it is 65 mm, which also is the inter-ocular distance between two human eyes
2) by the depth position of the objects in the scene, which, in the video domain, is measured as pixel distance between the LE image and the RE image of the objects. This value could be few pixels to several hundred pixels. The object depth position (determined by the depth map generator) during camera acquisition can be determined by measuring the pixel distance between the LE image and the RE image of the objects in a frame. The values from 1) and 2) are input to the method of the present invention and its corresponding apparatus.

The Corrected Convergence CorrConv value is added by the S3D color corrector in the post-production workflow and manually controlled by the operator. It is a modification of the Initial Convergence in a creative range—added to or subtracted from the InConv by few pixels to several hundred pixels. As the operator changes the value of the LE-RE convergence, this value could be displayed on the menu monitor, and could be entered in the processing of the present invention.

Motion Blur function is an adder or subtracter of the amount of the original scene motion blur. This function is the center of the present invention—it takes data from InConv, CorrConv, and IF Disp, weighted by coefficients K1, K2, K3 and adds or reduces the amount of scene blur. As an example, these coefficients could be numbers, thus the Motion Blur function is a linear function of its three variables. Nominally, K1, K2 and K3 are all in the range of 0.9 to 1.1 and they may or may not be the equal to each other.

The present invention analyzes the speed of the scene objects together with their S3D displacement, and by using a coefficient-based function processing on both, to deliver optimal motion blur for cleaner and smoother reproduction of dynamic scenes. It reduces the motion blur for slow speed objects that appear closer to the viewers, and slightly increases the motion blur for high speed objects, when they are closer to the audience. The method is adaptable to scene objects, to object speed, and to the S3D convergence.

Figure 3:
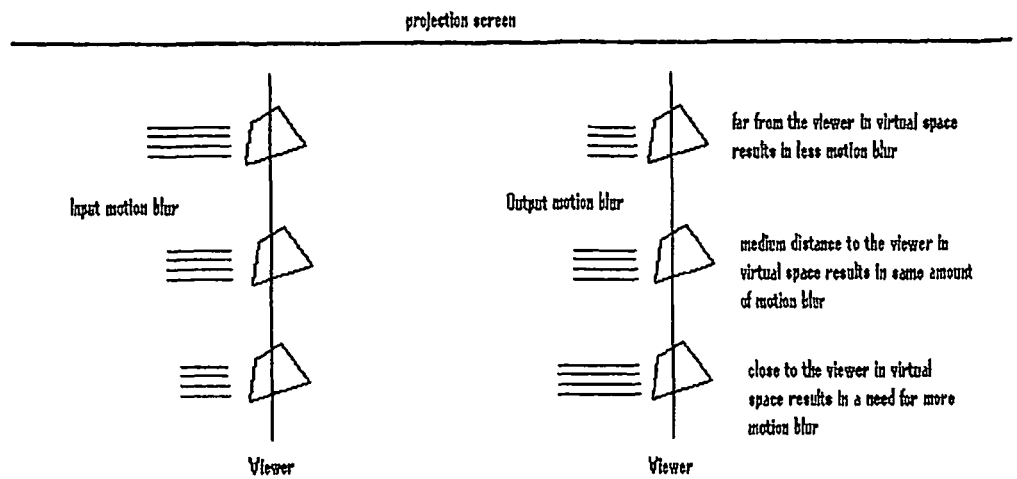
FIG. 3 depicts the amount of motion blur for a fast moving object.

FIG. 3 depicts the motion blur amount for a fast moving object, depending on the distance to the viewer eyes. The length of the horizontal lines indicates the adjustment in the motion blur. In the topmost object, the motion blur has been decreased. The speed of the 3D object was found to be less than the medium (nominal, threshold) speed so the motion blur was reduced. In the middle object, the speed of the 3D object was found to be equal or close to the medium (nominal, threshold) speed so no change was made to the motion blur. In the bottommost object the speed of the 3D object was found to be greater than the medium (nominal, threshold) speed so the motion blur was increased.

Figure 4:
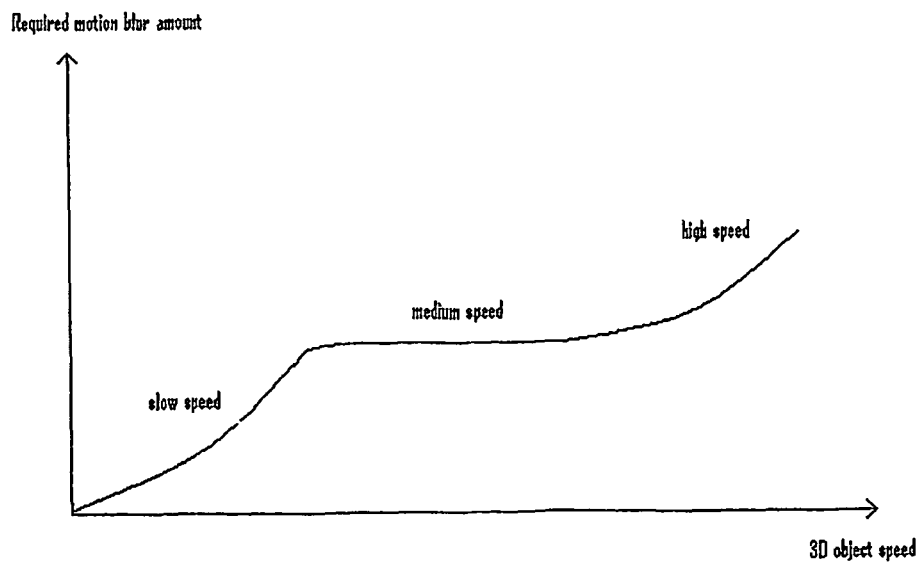
FIG. 4 shows the non-linear relationship between the object speed and the modified motion blur amount.

FIG. 4 shows the non-linear relationship between the object speed and the modified motion blur amount, per the method of the present invention.

Figure 5:
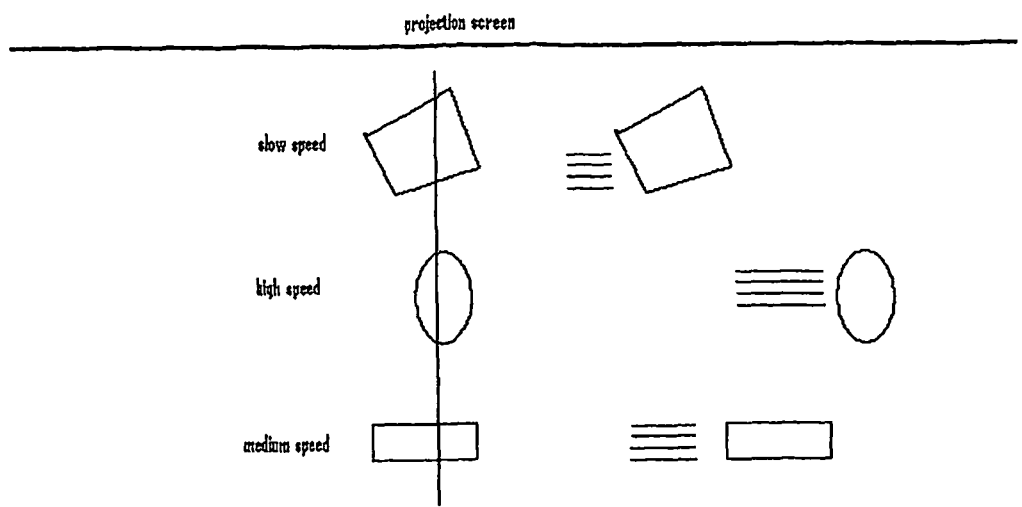
FIG. 5 expresses the motion blur amount depending on the object speed when the object is located at one and the same distance from the audience.

FIG. 5 expresses the motion blur amount depending on the object speed, when this object is located at one and the same distance from the audience. A slower speed 3D object requires less motion blur as shown for the topmost object. A high speed 3D object requires more motion blur as shown for the middle object. A medium speed 3D object (equal or close to the medium (nominal, threshold) speed) requires no change to its motion blur as shown in the bottommost object.

Figure 6A:
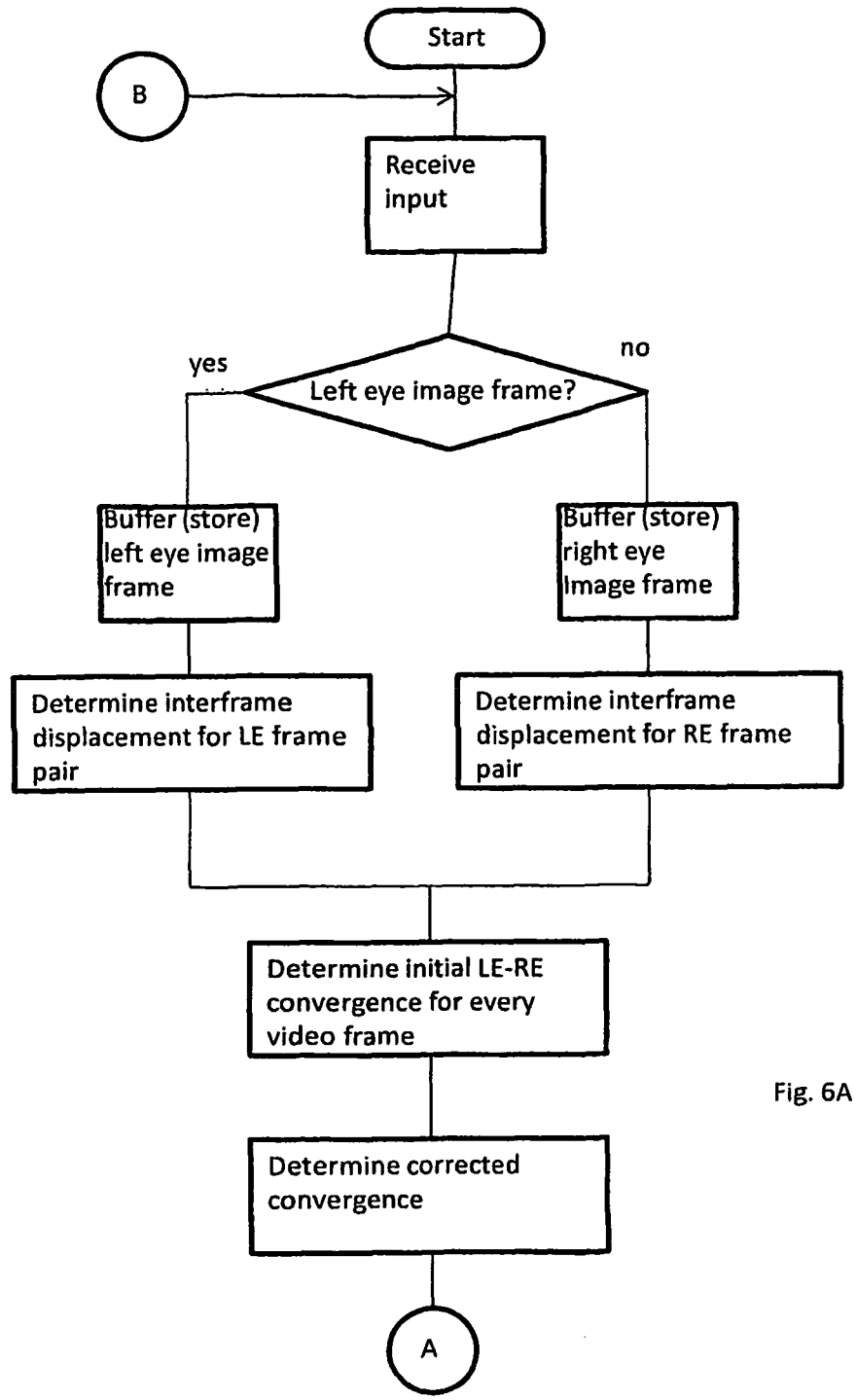
FIGS. 6A and 6B together are a flowchart of the method of an exemplary embodiment in accordance with the principles of the present invention.
Figure 6B:
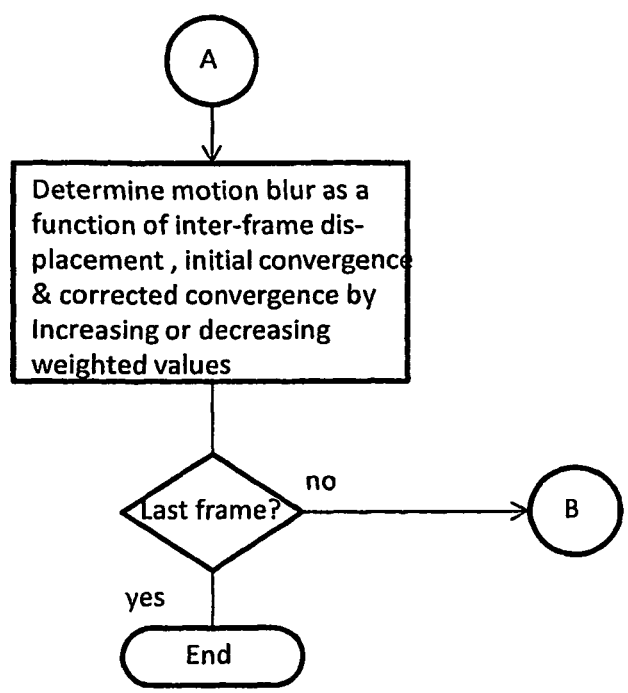

FIG. 6 shows the flowchart of an exemplary method of the present invention practiced in accordance with the above disclosure. At 605, a video frame is received (input), as part of a frame pair. A test is performed at 610 to determine if the input (data) is a left eye image. If the input is a left eye image then at 615 the left eye image input is stored in a buffer. As used herein a buffer can be any storage device or means. At 620 the inter-frame displacement of an object is determined between frame pairs of successive LE images. If the input was not a left eye image then it must have been a right eye image so at 625 the right eye image input is stored is a buffer. As used herein a buffer can be any storage device or means. At 630 the inter-frame displacement of an object is determined between frame pairs of successive RE images. At 635 the initial LE-RE convergence for every video frame pair is determined. There is a pixel shifting of between 5 and 100 pixels in either direction depending on the direction of travel of the object. At 640 the corrected convergence is determined. This is a parallel shifting along the horizontal of 10 to 70 pixels. At 645 the motion blur is determined as a function of the inter-frame displacement, the initial convergence and the corrected convergence by increasing or decreasing the weighted values. The result determines the needed motion blur per object. At 650 a test is performed to determine if the was the last frame. If the frame was not the last frame processing continues at 605.

Figure 7:
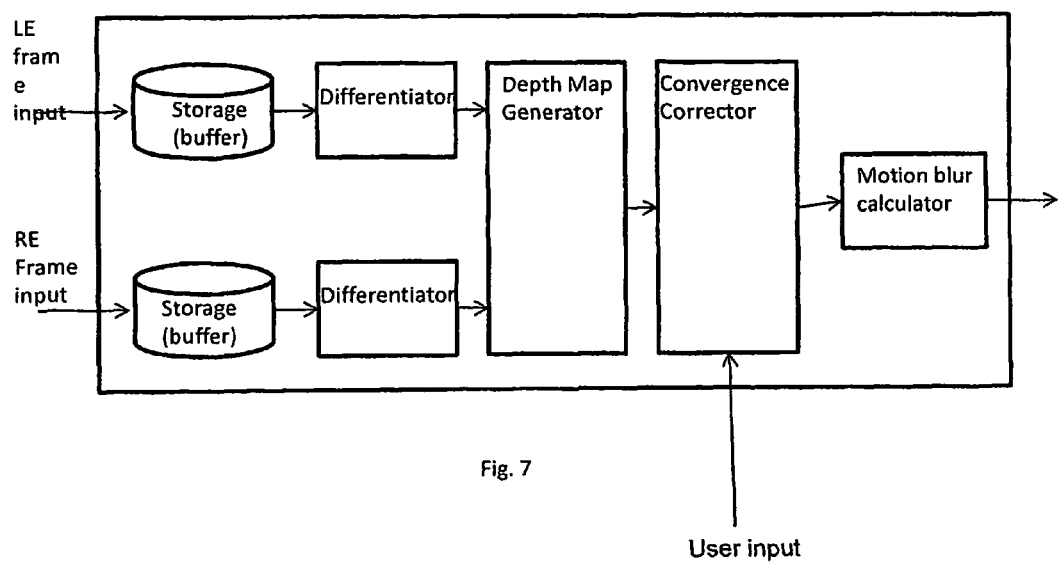
FIG. 7 is a block diagram of an exemplary embodiment of the present invention.

FIG. 7 is a block diagram of an exemplary embodiment of the present invention, which is best practiced in a post-production environment. The invention may be practiced as an add-on unit to existing post-production equipment or as a separate unit inserted into the post-production process. The apparatus of the present invention may include more or fewer modules than illustrated in FIG. 7. The modules of FIG. 7 correspond to functions of the method of the present invention. Input is received into the apparatus and stored in a buffer. There may be one of two buffers although two buffers or segregation of the data between left eye and right eye images is desirable. The storing of the data may be optional. The inter-frame displacement is determined for successive LE image frames by the differentiator at the top of the apparatus. The inter-frame displacement is determined for successive RE image frames by the differentiator at the bottom of the apparatus. The initial convergence is determined by the depth map generator and uses both LE and RE image data. The corrected convergence is determined by the convergence corrector with operator input. The motion blur is then determined by the motion blur calculator with the video frames (adjusting the objects for motion blur) being output.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for adjusting motion blur, said method comprising:
    first determining an inter-frame object displacement for each object in a left eye image frame pair;
    second determining an inter-frame object displacement for each object in a right eye image frame pair;
    third determining a convergence shifting field between each object in said left eye image frame pair and said right eye image frame pair;
    fourth determining an amount of motion blur responsive to said inter-frame object displacement for each object in said left eye image frame pair, said inter-frame object displacement for each object in said right eye image frame pair, and said convergence shifting field between each object in said left eye image frame pair and said right eye image frame pair, wherein said fourth determining act weights each of said inter-frame object displacement for each object in said left eye image frame pair, said inter-frame object displacement for each object in said right eye image frame pair, and said initial convergence and said corrected convergence and wherein said weights are in a range from 0.9 to 1.1; and
    adjusting said motion blur for each left eye image frame pair and said right eye image frame pair by said amount of motion blur, wherein said adjustment is an increase or decrease in said amount of motion blur in both the foreground and the background objects.

2. The method according to claim 1, further comprising:
    receiving left eye image data; and
    receiving right eye image data.

3. The method according to claim 1, wherein said third determining act further comprises:
    determining an initial convergence; and
    determining a corrected convergence.

4. The method according to claim 3, wherein said initial convergence further comprises pixel shifting of an initial depth position of each of said objects.

5. The method according to claim 3, wherein said corrected convergence further comprises parallel shifting of a corrected depth position of each of said objects.

6. The method according to claim 1, wherein said amount of motion blur is further correlated with a speed of each object and its convergence, said speed being determined for a given convergence value by said inter-frame object displacement for each object in said left eye image frame pair, said inter-frame object displacement for each object in said right eye image frame pair, and further wherein said correlation is one of if said speed is lower than a threshold speed then said amount of motion blur is reduced correspondingly and if said speed is greater than said threshold speed then said amount of motion blur is increased correspondingly and if said speed is close to said threshold speed then said amount of motion blur is retained unchanged.

7. The method according to claim 3, wherein said corrected convergence receives user input.

8. The method according to claim 1, wherein said amount of motion blur is further correlated with a speed of each object and its convergence, said speed being determined for a given convergence value by said inter-frame object displacement for each object in said left eye image frame pair, said inter-frame object displacement for each object in said right eye image frame pair, and further wherein said correlation is one of if said convergence is greater a threshold convergence then said amount of motion blur is increased correspondingly and if said convergence is less the threshold convergence then said amount of motion blur is reduced correspondingly and if said convergence is close to the threshold convergence then said amount of motion blur is retained unchanged.

9. An apparatus for adjusting motion blur, comprising:
    a first differentiator determining an inter-frame object displacement for each object in a left eye image frame pair;
    a second differentiator determining an inter-frame object displacement for each object in a right eye image frame pair;
    a convergence corrector determining a convergence shifting field between each object in said left eye image frame pair and said right eye image frame pair;
    a motion blur calculator determining an amount of motion blur responsive to said inter-frame object displacement for each object in said left eye image frame pair, said inter-frame object displacement for each object in said right eye image frame pair, and said convergence shifting field between each object in said left eye image frame pair and said right eye image frame pair, wherein said fourth determining act weights each of said inter-frame object displacement for each object in said left eye image frame pair, said inter-frame object displacement for each object in said right eye image frame pair, and said initial convergence and said corrected convergence and wherein said weights are in a range from 0.9 to 1.1; and
    said motion blur calculator adjusting said motion blur for each left eye image frame pair and said right eye image frame pair by said amount of motion, wherein said adjustment is an increase or decrease in said amount of motion blur in both the foreground and the background objects.

10. The apparatus according to claim 9, further comprising:
    a first storage buffer receiving left eye image data; and
    a second storage buffer receiving right eye image data.

11. The apparatus according to claim 9, wherein said convergence corrector further comprises:
    a depth map generator determining an initial convergence; and
    said convergence corrector determining a corrected convergence.

12. The apparatus according to claim 11, wherein said depth map generator further determines pixel shifting of an initial depth position of each of said objects.

13. The apparatus according to claim 11, wherein said convergence corrector further determines parallel shifting of a corrected depth position of each of said objects.

14. The apparatus according to claim 9, wherein said amount of motion blur is further correlated with a speed of each object and its convergence, said speed being determined for a given convergence value by said inter-frame object displacement for each object in said left eye image frame pair, said inter-frame object displacement for each object in said right eye image frame pair, and further wherein said correlation is one of if said speed is lower than a threshold speed then said amount of motion blur is reduced correspondingly and if said speed is greater than said threshold speed then said amount of motion blur is increased correspondingly and if said speed is close to said threshold speed then said amount of motion blur is retained unchanged.

15. The apparatus according to claim 11, wherein said corrected convergence further receives user input.

16. The apparatus according to claim 9, wherein said amount of motion blur is further correlated with a speed of each object and its convergence, said speed being determined for a given convergence value by said inter-frame object displacement for each object in said left eye image frame pair, said inter-frame object displacement for each object in said right eye image frame pair, and further wherein said correlation is one of if said convergence is greater than a threshold convergence then said amount of motion blur is increased correspondingly and if said convergence is less than the threshold convergence then said amount of motion blur is reduced correspondingly and if said convergence is close to the threshold convergence then said amount of motion blur is retained unchanged.

\* \* \* \* \*